United States Patent [19]
Cherukuri et al.

[11] 4,352,823
[45] Oct. 5, 1982

[54] COEXTRUDED CHEWING GUM CONTAINING A SOFT NON-SBR GUM CORE PORTION

[75] Inventors: Subraman R. Cherukuri; Raymond L. Roy; Dominick R. Friello, all of Danbury, Conn.; Stephen H. Wolf, Rye, N.Y.

[73] Assignee: Nabisco Brands, Inc., New York, N.Y.

[21] Appl. No.: 253,442

[22] Filed: Apr. 13, 1981

[51] Int. Cl.³ .......................... A23G 3/30; A23G 3/00
[52] U.S. Cl. ...................................... 426/5; 426/648; 426/658
[58] Field of Search ....................... 426/3-6, 426/548, 658

[56] References Cited

U.S. PATENT DOCUMENTS

| | | | |
|---|---|---|---|
| 1,193,423 | 8/1916 | Pryor | 426/5 |
| 3,857,963 | 12/1974 | Graff et al. | 426/5 |
| 3,984,574 | 10/1976 | Comollo | 426/4 |
| 4,085,227 | 4/1978 | Mackay et al. | 426/3 |
| 4,117,645 | 10/1978 | Phillips | 426/5 |
| 4,187,320 | 2/1980 | Koch | 426/3 |
| 4,217,368 | 8/1980 | Witzel | 426/5 |
| 4,250,195 | 2/1981 | Cherukuri et al. | 426/5 |
| 4,271,199 | 6/1981 | Cherukuri et al. | 426/5 |

Primary Examiner—Jeanette M. Hunter
Attorney, Agent, or Firm—Richard Kornutik

[57] ABSTRACT

A coextruded chewing gum is provided which includes an extruded center portion surrounded by and bonded to an extruded outer shell portion. The center portion of the coextruded chewing gum formed of a non-SBR gum, will be of a generally soft consistency, a moisture content of at least about 5% up to about 10% by weight of the core, while the outer shell portion will provide a protective layer or coating for the core portion to inhibit sweating and stickiness and thereby allow for use of conventional wrapping machines.

23 Claims, No Drawings

COEXTRUDED CHEWING GUM CONTAINING A SOFT NON-SBR GUM CORE PORTION

FIELD OF THE INVENTION

The present invention relates to a coextruded chewing gum and more particularly to a coextruded chewing gum which includes a non-SBR center gum portion or core which has a very soft texture. Until now, it has not been possible to handle such soft chewing gums in conventional gum wrapping machines.

BACKGROUND OF THE INVENTION

Generally, the softness of chewing gum is directly related to the amount of moisture or other liquids contained therein. Although it is desirable to increase gum softness so as to enhance bite-through and chew properties, the degree of softness of commercial chewing gum has been severely restricted due to manufacturing and packaging problems.

Accordingly, a need still exists for a chewing gum which has a soft consistency and yet is capable of being manufactured and packaged using standard equipment.

DESCRIPTION OF THE INVENTION

In accordance with the present invention, a chewing gum is provided which may be manufactured and packaged using conventional equipment and yet may have a soft consistency without unduly sticking to such equipment or to its wrapper. The chewing gum of the invention is a coextruded chewing gum which is formed of an extruded soft non-styrenebutadiene (non-SBR) gum center or core portion, and an outer gum or shell portion having a harder consistency than the soft gum center or core portion, coextruded with and about the soft core portion.

In a preferred embodiment of the invention, the core portion will contain in excess of 1%, usually above 5 and up to 10% moisture, and preferably from about 6 to about 8% by weight moisture, that is, amounts of moisture not normally employed in all-solid chewing gums. Although the core portion is, of itself, soft, sticky and difficult to handle, through co-extrusion techniques, the outer shell layer acts as a support and protective coating for the soft and sticky inner core portion.

The present invention also includes a method for forming the coextruded chewing gum described above which method includes the steps of providing a soft non-styrene-butadiene (non-SBR) chewing gum (as described above) for the core portion which chewing gum contains at least in excess of about 5% by weight moisture based on the weight of said core portion, providing a chewing gum for the outer shell portion, extruding a rope of the chewing gum comprising the soft gum core portion, and simultaneously extruding a rope of the chewing gum comprising the outer shell portion about the extruded core portion to completely surround and form a protective barrier around and bonded to the core portion and thereby retard migration of moisture from the core portion to the outer shell portion.

Although the core gum portion is too soft to adequately manipulate same into the desired product form and perhaps to wrap same without sticking, these problems are overcome by the method of the invention since the outer shell portion is bonded and is supportive of the less manageable soft core portion before handling or packaging of the core portion.

The coextruded chewing gum of the invention will comprise from about 5 to about 90% by weight and preferably from about 40 to about 75% by weight of the soft core portion, and from about 10 to about 95% by weight, and preferably from about 25 to about 60% by weight of the outer shell portion. Thus, the core portion will be in a weight ratio to the shell portion of within the range of from about 0.05:1 to about 9:1, and preferably from about 0.67:1 to about 3:1 whereby the outer shell will coat and protect the core portion and prevent moisture from migrating to the shell portion and subsequently into the atmosphere.

The soft gum core portion will preferably be formed of a sugar containing chewing gum, although soft sugarless chewing gums may be employed as well. In a preferred embodiment of the invention, the sugar containing soft gum core portion will have a short nougat-like or fondant-like structure, a long-lasting sweetness, a soft and smooth consistency, an amorphous bite through and easy chew and a high moisture content (from over about 5 to about 10%, preferably from about 6 to about 8% moisture).

The chewing gum forming the outer shell portion may comprise chewing gum formulations generally known in the art. Each of the core and shell chewing gums may be of the sugar-containing or surgarless variety. Thus, in the sugar-containing coextruded chewing gum of the invention, both the core and outer shell portions may be sugar-containing or one may be sugar-containing and the other sugarless. For example, a coextruded chewing gum of the invention having an initial sweet taste and while still providing prolonged sweetness, may include a sugar-containing outer shell portion as disclosed in U.S. application Ser. No. 102,069 and in U.S. application Ser. No.953,291, now U.S. Pat. No. 4,217,368, which provides for initial sweetness impact and which may include a non-styrene-butadiene gum base. The composition of the soft core portion is described elsewhere.

A preferred sugarless chewing gum for the outer shell portion is disclosed in U.S. Pat. Nos. 4,064,274, 4,085,227 and 4,217,368. Again, the gum base employed may be a non-styrene-butadiene base.

The soft core portion includes a non-styrene-butadiene gum base wherein the elastomer is a polyisobutylene of medium molecular weight (of from about 750,000 to about 1,300,000 [Floryl]) or of lower molecular weight (of from about 37,000 to about 80,000 [Floryl]) or a mixture of polyisobutylene of medium molecular weight (from about 750,000 to about 1,300,000 [Floryl]), and lower molecular weight (from about 37,000 to about 80,000 [Floryl]) together with a combination of plasticizers including acetylated mono and triglycerides such as glyceryl monoacetate, and glyceryl triacetate together with a hydrophilic type detackifier, such as polyvinyl acetate and a combination of ingredients to impart non-stick properties which include polyterpene resin (which also serves as a filmformer to aid in blowing bubbles), one or more hard waxes to enhance slip and bite through characteristics and optionally polyethylene wax to impart non-tack properties. In addition, the gum base for the soft core portion will contain an emulsifier, such as glyceryl monostearate, optionally hydrogenated or partially hydrogenated fatty acid esters of vegetable or animal origin to impart softening and plasticity, and one or more fillers/texturizing agents.

In forming the gum base for use in the soft core portion, and, if desired, in the outer shell as well, polyisobutylene elastomer (including mixtures thereof) will be present in an amount within the range of from about 0.5 to about 25% and preferably from about 4 to about 16% by weight of the gum base. Where mixtures are employed, the medium molecular weight (750,000 to 1,300,000) polyisobutylene will be present in a weight ratio to the lower molecular weight (37,000 to 80,000) polyisobutylene of within the range of from about 1:1 to about 1:10, and preferably from about 1:1 to about 1:6. The presence of both the medium and lower molecular weight polyisobutylenes are desirable to provide cohesiveness, resistance to oxidation and good bubble blowing; the medium molecular weight polyisobutylene itself provides a good bubble blowing film.

The mixture of glyceryl triacetate and acetylated monoglyceride plasticizers are essential to the non-styrene-butadiene gum base for imparting softness and plasticization thereto. The glyceryl triacetate will be present in an amount of within the range of from about 0 to about 10%, and preferably from about 1 to about 8% by weight of the gum base, while the acetylated monoglyceride will be present in an amount of within the range of from about 0 to about 15%, and preferably from about 1 to about 10% by weight of the gum base.

The hydrophilic-type detackifier will sorb saliva and become slippery and is incompatible with the elastomer and solvent for the elastomer. Examples of such materials suitable for use herein will include vinyl polymers having a molecular weight of at least 2,000, and preferably within the range of from about 2,000 to about 10,000 or more, such as polyvinyl acetate, polyvinyl butyl ester and copolymers of vinyl esters and vinyl ethers. The hydrophilic-type detackifier will be employed in an amount ranging from about 5% to about 60%, preferably from about 10 to about 45%, and optimally from about 15 to about 30% by weight of the gum base.

The optional softening-plasticizing agent which may be employed herein comprises one or more hydrogenated vegetable or animal fats having a high melting point, that is, above about 22° C. and preferably above about 50° C., and will be employed in amounts ranging from about 0.5 to about 25% by weight of the gum base, preferably from about 2 to about 18%, and optimally from about 7 to about 12%. Examples of such fatty material useful herein include hydrogenated soyabean oil (or flakes), cottonseed oil, corn oil, peanut oil, cocoa butter, and palm oil, as well as animal fats, such as tallow or lard; preferred is a mixture of from about 2 to about 10%, and preferably from about 3 to about 8% by weight hydrogenated soyabean oil and from about 2 to about 15%, and preferably from about 4 to about 10% by weight cottonseed oil flakes and/or cocoa butter, based on the weight of the gum base.

The emulsifier will impart hydrophilic properties to the gum base so that saliva will be absorbed thereby making the gum base slippery and will be employed in amounts ranging from about 0.1 to about 10% by weight of the gum base, preferably from about 4 to about 7%, and optimally from about 5 to about 7%. Examples of such emulsifiers include glyceryl monostearate, phosphatides, such as lecithin and cephalin, Tweens, Spans, and mixtures thereof. Preferred is glyceryl monostearate.

Where it is desired to impart non-tack or non-stick properties to the non-styrene-butadiene gum base, the gum base will preferably include a polyethylene wax having a melting point of at least 170° F. and preferably from about 170° to about 300° F., employed in amounts of from about 0.25 to about 5%, and preferably from about 1 to about 4% by weight of the gum base.

The waxes suitable for use in the gum base composition serve as slip agents or lubricants and enhance bite through and should have a melting point of above about 35° C. and preferably above about 70° C. Examples of such waxes include candelilla wax, paraffin wax, carnauba wax, ozokerite, oricury, microcrystalline wax and the like. The waxes will be employed in an amount within the range of from about 2 to about 25% by weight of the gum base, preferably from about 6 to about 18%, and optimally from about 8 to about 15% by weight. The preferred waxes are microcrystalline wax and paraffin wax, preferably employed in combination so that from about 0 to about 15% (based on the weight of the gum base) of the microcrystalline wax is employed with from about 0 to about 15% (based on the weight of the gum base) of the paraffin wax. The waxes are found to reduce the tackiness of the final gum composition without significantly reducing cohesivity thereof and also improve bite through and soft chew of the final gum product.

The polyterpene resin, which functions as a tackifier-film former and plasticizer for polyisobutylene and aids in blowing bubbles and increasing film thickness, will be present in an amount within the range of from about 0 to about 25%, and preferably from about 4 to about 20% by weight of the gum base.

Other anti-tack agents may be employed in place of or together with the polyethylene wax, such as titanium dioxide in amounts of from about 0.3 to about 1% by weight of the gum base as disclosed in U.S. Pat. No. B 3,974,293, gelatin-tannic acid as disclosed in U.S. Pat. No. 3,255,018 or other conventional anti-tack agents.

The filler-texturizing agent is employed to adjust the texture of the gum to impart good lubricant and flavor release properties and will be employed in amounts ranging from about 0 to about 60% by weight of the gum base composition, preferably from about 15 to about 45% by weight, and optimally from about 20 to about 30% by weight. Examples of such texturizing agents suitable for use herein include ground limestone (calcium carbonate), talc, hydrated aluminum oxide, and magnesium trisilicate, with calcium carbonate being preferred.

The following represents preferred formulations of non-styrene-butadiene gum base employed in the soft core portion (and optionally in the outer shell portion) in accordance with the present invention:

| Gum Base | | |
|---|---|---|
| Ingredient | | % by Weight of Gum Base |
| Polyisobutylene molecular weight - 950,000 1,050,000 [Flory] | | 0 to 10 ⎫ total |
| molecular weight - 37,000 46,000 [Flory] | | 0 to 18 ⎬ elastomers at least 4% |
| Polyterpene resin | | 4 to 20 |
| Microcrystalline wax | | 0 to 15 ⎫ total |
| Paraffin wax | | 0 to 15 ⎬ waxes |
| Polyethylene wax | | 0.25 to 5 ⎭ at least 2% |
| Glyceryl triacetate | | 1 to 8 |
| Acetylated monoglyceride | | 1 to 10 |
| Glyceryl monostearate | | 2 to 8 |
| Hydrogenated soyabean oil flakes | | 2 to 8 |
| Hydrogenated cottonseed oil flakes | | 2 to 10 |
| Calcium carbonate | | 15 to 35 |

| Gum Base | |
|---|---|
| Ingredient | % by Weight of Gum Base |
| Polyvinyl acetate | 15 to 30 |

The non-styrene-butadiene gum base may be prepared using conventional processing techniques. For example, the polyisobutylene resins, waxes and polyterpene resin are mixed for 6 to 15 hours so that a substantially uniform mixture of polyisobutylene and polyterpene dissolved in the wax is formed without lumps. The remaining ingredients may then be added to the uniform paste with mixing to form the non-SBR gum base.

However, a preferred method for forming the soft core gum base includes the steps of mixing the one or mixture of two types of polyisobutylenes together with the filler-texturizing agent, adding polyterpene resin to the mixture and mixing for about 0.5 to 4 hours and preferably mixing for 0.5 to 3 hours, and optimally for 0.5 to 1.5 hours to form a paste wherein the polyisobutylene are incorporated without leaving fish-eye type particles. The shearing action of the mixing blades on the filler breaks up the polyisobutylene resins into particles to form a uniform paste. Thereafter, the remaining ingredients including the anti-tack agent, polyvinyl acetate, microcrystalline wax, paraffin wax, glyceryl triacetate, acetylated monoglyceride, glyceryl monostearate, hydrogenated soyabean oil and hydrogenated cottonseed oil flakes are separately added with mixing to form the non-SBR gum base.

The soft core portion will also include a premixed recrystallized combination of at least two sweeteners, including solid and liquid sweeteners, which preferably include sucrose and/or sorbitol and/or hydrogenated starch hydrolysate, and high fructose syrup alone or together with liquid glucose, hydrogenated starch hydrolysate syrup, corn syrup, sorbitol syrup and/or invert sugar, in the recrystallized mixture, and flavors, softeners and other conventional chewing gum ingredients.

It is essential that the liquid and solid sweeteners mentioned above comprise a preformed combination of a particulate solid sweetener particles of which are coated with a syrup sweetener and which mixture has been heated, dried to a homogeneous mass, and then cooled to recrystallize the mass into an amorphous solid. The recrystallized sweeteners impart a soft smooth consistency and texture to the chewing gum, similar to that found in nougat-type or fondant-type candies and non-stick properties as well.

Furthermore, the above premixed combination of sweeteners may comprise a so-called "dry fondant" mix formed of the above-mentioned sweeteners which is reconstituted with water and then added to the gum base and other chewing gum ingredients to form the soft chewing gum core portion of the coextruded chewing gum of the invention.

The preferred soft chewing gum portion of the coextruded chewing gum of the invention comprises a sugar-containing chewing gum which includes a non-styrene-butadiene gum base in an amount within the range of from about 12 to about 40% and preferably from about 15 to about 35% by weight of the chewing gum, which includes the preformed recrystallized combination of liquid and solid sweeteners comprising from about 40 to about 85%, and preferably from about 60 to about 80% by weight of the chewing gum.

The preformed sweetener combination will comprise solid sweeteners, such as sucrose, lactose, maltose, sorbitol, fructose, dextrose, arabinose, xylose, ribose, mannose, galactose, hydrogenated starch hydrolysate, or mixtures of two or more of the foregoing, and liquid sweeteners, such as any of the above dissolved in water, such as corn syrup, sorbitol syrup, fructose syrup, invert syrup, glucose syrup, hydrogenated starch syrups, and the like. The above syrups will preferably contain from about 50 to about 99% by weight solids and preferably from about 70 to about 90% by weight solids. The solids and liquids will be employed in the preformed sweetener combination in a weight ratio to each other (solids:liquids) of within the range of from about 1:1 to about 30:1 and preferably from about 2:1 to about 19:1.

It is theorized that upon pre-mixing of the solid sweeteners and liquid sweeteners, the crystals of solid sweetener, such as crystals of sugar, are reduced in size, becoming more round, more smooth and slippery, and thereby contributing to the soft easy bite through and fondant structure of the soft chewing gum core portion. This is indeed surprising and unexpected inasmuch as this effect is opposite to the usual behavior of powdered crystals added to water wherein there is an apparent coarsening effect due to preferential solubility of fine crystals.

Particularly preferred preformed sweetener combinations, wherein a solid sweetener is coated with a syrupy sweetener, comprise from about 35 to about 95% sucrose (or sucrose dissolved in water) as the solid sweetener and from about 5 to about 50% high fructose syrup (containing from about 40 to about 90% fructose), alone or in combination with from about 1 to about 30% liquid glucose, from about 1 to about 30% corn syrup, from about 1 to about 25% invert sugar, all of the above % being based on the weight of the preformed combination of solid and liquid sweeteners. In such preferred combinations, the solid sweetener will be employed in a weight ratio to the liquid sweetener of within the range of from about 1:1 to about 30:1.

The hydrogenated starch syrup also referred to as hydrogenated starch hydrolysates, which may be employed herein may include those disclosed in U.S. Pat. No. Re. 26,959 or U.S. Pat. No. 3,556,811 as well as various hydrogenated glucose syrups and/or powders which contain sorbitol, hydrogenated disaccharides, hydrogenated tri- to hexa-saccharides, and hydrogenated higher polysaccharides, or mixtures of any two or more of the above.

The hydrogenated glucose syrups and/or powders may be produced by catalytic hydrogenation of standard glucose syrups (acid and/or enzyme converted) to the point where all the glucose end groups of the saccharides are reduced to alcohols, that is, dextrose end groups to sorbitol end groups. In the case of hydrogenated glucose syrups, the total solids are made of from about 4 to about 30% sorbitol, from about 5 to about 65% hydrogenated disaccharides (that is, maltitol), from about 15 to about 75% tri- to hepta-hydrogenated saccharides, and from about 1 to about 65% hydrogenated saccharides higher than hepta.

Examples of particularly suitable hydrogenated starch hydrolysates include from about 6 to about 10% sorbitol, from about 25 to about 55% hydrogenated disaccharides, from about 20 to about 40% hydrogenated tri- to hepta-saccharides, and from about 15 to about 30% hydrogenated saccharides higher than hepta.

Another example of suitable hydrogenated starch hydrolysates include from about 8 to about 20% sorbitol, from about 5 to about 15% hydrogenated disaccharides, and from about 2 to about 75% hydrogenated tri- to penta-saccharides.

Particularly preferred are hydrogenated starch hydrolysates of the following compositions.

|  | Parts by Weight | |
|---|---|---|
|  | 1 | 2 |
| Sorbitol | 10.5 | 17 |
| Hydrogenated disaccharides | 7.5 | 13 |
| Hydrogenated tri- to penta-saccharides | 20 | 70 |
| Hydrogenated saccharides higher than penta and higher saccharide alcohols | 62 |  |

|  | Parts by Weight | | | |
|---|---|---|---|---|
|  | 3 | 4 | 5 | 6 |
| Sorbitol | 5–8 | 6–8 | 6–8 | 5–8 |
| Hydrogenated disaccharides | 50–58 | 40–45 | 25–30 | 25–58 |
| Hydrogenated tri- to hexa-saccharides | 20–25 | 25–30 | 35–40 | 20–40 |
| Hydrogenated saccharides higher than hexa | 15–20 | 20–25 | 25–30 | 15–30 |

The hydrogenated starch hydrolysate as described above may be employed as a substitute for corn syrup, fructose syrup or other plasticizer or softener, sugar and even sugar alcohols.

The soft core gum portion may also include flavoring, such as sour or fruit flavoring or non-acid or mint flavoring in an amount ranging from about 0.3 to about 2.0% by weight, and preferably from about 0.5 to about 1.2% by weight of the final gum product. The flavoring may comprise synthetic flavors and oils derived from plants, leaves, flowers, fruit, etc. Representative flavor oils of this type include acids such as adipic, succinic and fumaric acid, citrus oils such as lemon oil, orange oil, lime oil, grapefruit oil, fruit essences such as apple essence, pear essence, peach essence, strawberry essence, apricot essence, raspberry essence, cherry essence, plum essence, pineapple essence, as well as the following essential oils: peppermint oil, spearmint oil, mixtures of peppermint oil and spearmint oil, clove oil, bay oil, anise oil, eucalyptus oil, thyme oil, cedar leaf oil, cinnamon oil, oil of nutmeg, oil of sage, oil of bitter almonds, cassia oil, and methylsalicylate (oil of wintergreen). Various synthetic flavors, such as mixed fruit, may also be incorporated in preservatives.

As indicated, the soft gum core portion may also include a natural sugar including any of those set out hereinbefore in the listing of solid sweeteners employed in the preformed combination, as well as a non-sugar or artificial sweetener employed in conjunction with the preformed sweetener combination.

Examples of artificial sweeteners (also referred to as non-sugar sweetener or sugar substitutes), which may be employed herein include poorly or readily water-soluble sweeteners, such as the free acid form of saccharin, sodium, calcium or ammonium saccharin salts, dihydrochalcones, glycyrrhizin, dipotassium glycyrrhizin, glycyrrhizic acid ammonium salt, L-aspartyl-L-phenylalanine methyl ester, the sodium salt or potassium salt of 3,4-dihydro-6-methyl-1,2,3-oxathiazine-4-one-2,2-dioxide (Ace-sulfame-K) as well as *Stevia rebaudiana* (Stevioside), *Richardella dulcifica* (Miracle Berry), *Dioscoreophyllum cumminsii* (Serendipity Berry), free cyclamic salts, and the like, or mixtures of any two or more of the above.

The soft gum portion may also contain other miscellaneous ingredients, such as conventional ester gums, polydextrose, fillers, such as calcium carbonate, and texturizers, such as hydrated alumina, plasticizers, softeners or emulsifiers, such as lecithin, fatty acids, glycerin, glyceryl monostearate, hydrogenated vegetable oils, sorbitan monostearate, tallow, isomaltitol, propylene glycol, F.D. and C. coloring agents, and other conventional chewing gum additives as will be apparent to those skilled in the art.

The soft gum core portion may be prepared by the following procedure.

The preformed recrystallized sweetener combination is first prepared by heating a mixture of the solid sweetener (e.g., powdered sugars or liquid sugars in water) and the liquid sweetener (e.g., high fructose syrup, liquid glucose, corn syrup, invert sugar, or a mixture of two or more of the above) at a temperature within the range of from about 200° to about 260° F., and preferably from about 230° to about 250° F., with or without stirring, to form a homogeneous mass, and then cooling the homogeneous mass, for example, by exposing to ambient air or a cooled surface. One or more conventional techniques are employed, such as seeding or stirring to cause the sweeteners to recrystallize and form an amorphous mass.

As indicated, reconstituted "dry fondant" mix may also be employed.

The soft gum itself is prepared by mixing melted gum base (heated at, for example, 160°–175° F.) and color, adding about one-third of the preformed sweetener combination and mixing for 1 to 3 minutes, adding a second one-third portion of preformed sweetener combination to the mixture and mixing an additional 1–3 minutes, adding softener and moisture retaining substance, such as corn syrup solids, and mixing for 1–2 minutes, adding softener, such as lecithin, and flavor, and mixing for 1–2 minutes, and then adding the remaining portion of preformed sweetener combination with stirring, and then optionally adding spray-dried flavor and mixing the entire mass for 2 to 5 minutes.

If desired, the above may be mixed with one or more easily extractable water-soluble sweeteners, such as natural sugar, soluble saccharin salts, aspartame, Ace-sulfame-K, water-soluble food acid and/or flavors. The resulting mix is then ready for coextrusion.

Preferred soft gum core portion which may be included in the coextruded chewing gum of the invention in accordance with the present invention will have the following composition:

| Ingredient | Parts by Weight |
|---|---|
| Non-SBR gum base | 10 to 35 |
| Preformed sweetener combination | |
| A. Solid sweetener | |
|     Powdered sugar | 20 to 85 |
| B. Liquids | |
|     High fructose syrup (40–90% solids) | 0 to 50 |
|     Liquid glucose | 0 to 50 |

| Ingredient | Parts by Weight |
| --- | --- |
| Invert sugar | 0 to 50 |
| Flavor | 0.2 to 1.5 |
| Lecithin | 0 to 1 |
| Corn syrup solids | 0 to 15 |
| Glycerin | 0 to 2 |

In another preferred embodiment of the present invention, the core gum portion contains pure fructose syrup (also referred to as high fructose corn syrup) as a replacement for corn syrup. It was previously thought that it would be impossible to employ large amounts of pure fructose syrup in chewing gum because of high water absorption resulting in extreme sweating problems and sticking of the chewing gum to its wrapper. However, it has been found that where the high fructose gum is used as the core portion, the outer protective shell serves to prevent moisture from migrating from the core to the exterior surface of the coextruded gum.

The high fructose core portion has a short-structure, that is, is easily torn apart, and will comprise gum base, pure fructose syrup, sweetener-bulking agent, such as sucrose, flavor and optionally additional plasticizer and color.

In forming the core portion, the pure fructose syrup will be employed in an amount within the range of from about 5 to about 30%, and preferably from about 8 to about 20% by weight of the core. The fructose syrup will contain from about 25 to about 95% solids, and preferably from about 40 to about 90% solids, in the form of fructose. Alternatively, the core gum portion may contain fructose solids in amounts equivalent to that present in the fructose syrup, as described above.

The high fructose gum portion may include a sweetener-bulking agent which will be employed in an amount of from about 30 to about 80% by weight, and preferably, from about 45 to about 70% by weight.

Examples of sweetener-bulking agents which may be employed herein are set out hereinbefore with respect to other embodiments of core portions.

The high fructose core gum portion may also contain an artificial sweetener, such as, for example, aspartame, cyclamate, or a saccharin or other sweetener as set out hereinbefore, the artificial sweetener being present in an amount of from about 0 to 0.5% by weight, and preferably, from about 0.05 to about 0.2% by weight. Other examples of artificial sweeteners suitable for use in the high fructose core are set out hereinbefore with respect to other embodiments of core portions.

The high fructose core portion may be prepared by conventional gum making techniques.

In a preferred method for making the high fructose core portion, gum base is melted and maintained at 170° F. to 200° F. About ⅓ of the sweetener-bulking agent is mixed with the gum base to disperse same throughout the continuous mass of gum base thereby trapping the sweetener-bulking agent in the gum base.

Thereafter, the flavor is added with mixing and the remaining sweetener-bulking agent is added with mixing thereby causing the mass to be torn apart into discrete pieces. The pure fructose syrup is added to the discrete pieces of gum base with mixing and other flavors including spray dried flavor may then be added with mixing. The mass, now smooth and continuous, is then ready for being cut into pieces and wrapped.

It will be appreciated that the pure fructose syrup may be added before the second batch of sweetener-bulking agent is added, and/or as described above, after the second batch of sweetener-bulking agent is added.

Preferred high fructose core formulations are set out below.

| Ingredient | Parts by Weight |
| --- | --- |
| Non-SBR gum base | 10 to 30 |
| Pure fructose syrup (40 to 90% fructose solids) | 8 to 25 |
| Sugar (or other bulking agent) | 40 to 75 |
| Liquid flavor | 0.5 to 1.5 |
| Other plasticizer | 0.2 to 2 |
| Color | 0 to 0.5 |

In other embodiments, the soft core portion may have the following compositions:

| Sugar Chewing Gum | |
| --- | --- |
| Ingredient | % by Weight of Gum Base |
| Non-SBR gum base | 20 to 30 |
| Powdered sugar | 45 to 65 |
| Corn syrup | 15 to 30 |
| Lecithin | 0 to 0.5 |
| Flavor oil | 0.5 to 1.5 |
| Coloring | 0 to 0.5 |

| Sugarless Chewing Gum | |
| --- | --- |
| Ingredient | % by Weight of Gum Base |
| Non-SBR gum base | 20 to 30 |
| Sorbitol | 45 to 65 |
| Hydrogenated starch hydrolysate | 10 to 22 |
| Lecithin | 0 to 0.75 |
| Flavor oil | 0.5 to 2 |
| Glyceride | 0 to 6 |

The outer shell portion of the coextruded chewing gum of the invention may contain any of the sweeteners, flavors, bulking agents, gum base ingredients and other miscellaneous ingredients which may be present in the soft core portion and which are set out in detail hereinbefore.

Thus, the gum base forming the outer shell portion may be of the non-SBR type similar to that employed in the soft core portion. Alternatively, the outer shell may include a conventional styrene-butadiene type gum base. In any event, the outer shell gum portion will include gum base in an amount ranging from about 10 to about 50%, and preferably from about 20 to 40% by weight of the chewing gum composition.

In general, the outer shell gum base may be prepared by heating and blending various ingredients, such as natural gum, synthetic resins, waxes, plasticizers, etc., in a manner well known in the art. Typical examples of the ingredients found in a chewing gum base are masticatory substances of vegetable origin, such as chicle, crown gum, nispero, rosidinha, jelutong, pendare, perillo, niger gutta, tunu, etc., masticatory substances of synthetic origin, such as butadiene-styrene polymer, isobutyleneisoprene copolymer, petroleum wax, polyethylene, polyisobutylene, polyvinylacetate, etc., plasticizers, such as lanolin, stearic acid, sodium stearate, potassium stearate, etc., antioxidants, such as, butylated hydroxyanisole, butylated hydroxytoluene, and propyl gallate.

The chewing gum forming the outer shell portion itself may be prepared employing conventional chewing gum manufacturing techniques.

The outer shell chewing gum portion may be prepared as follows. The gum base is first melted; thereafter the melted gum base is cooled to below about 200° F., and preferably below about 180° F., and softener, such as lecithin, is thoroughly mixed for about 1 to 5 minutes in the gum base which at this time is in the form of a continuous mass. Thereafter, from about 10 to about 40% by weight of the total amount of sweetener-bulking agent, which preferably is fine granular sugar, is mixed for about 2 to about 10 minutes with the continuous mass of gum base and softener during which time the continuous mass breaks up into granules or chunks. The corn syrup solids are then mixed with the granules for about 4 to about 6 minutes and then the remaining sweetener-bulking agent and flavors are mixed with the above mixture for about 1 to about 3 minutes to form a fine granular aerated discontinuous mass. Finally, the liquid sorbitol is added to the discontinuous mass and mixed therewith for about 3 to about 6 minutes to form a cohesive, but still discontinuous mass. Thereafter, if desired, solid flavor may be added and mixed with the gum base mix to form a chewing gum which is ready for extrusion.

A preferred chewing gum composition which may be employed in extruding the outer shell portion is set out below.

| Ingredient | Parts by Weight |
|---|---|
| Gum Base | 15 to 32 |
| Softener (e.g. lecithin) | 0.1 to 1 |
| Corn syrup solids (D.E. 20-42) | 4 to 15 |
| Sugar (or other bulking agent) | 40 to 75 |
| Liquid flavor | 0.5 to 3 |
| Other plasticizer | 0.2 to 2 |
| Liquid sorbitol (65 to 75% solids) | 5 to 18 |
| Color | 0 to 0.5 |

Other preferred chewing gum formulations which are especially designed for both long-lasting prolonged sweetness and flavor release and also for initial burst of sweetness are set out below. These compositions may be employed in the outer shell portion.

| | Sugar-Containing | Range % by Weight of Chewing Gum |
|---|---|---|
| A. | Water-soluble phase | |
| | Sorbitol syrup (% solids 68 to 72) | 3–12 |
| | Sugar | 28–32 |
| B. | Water-insoluble phase | |
| | Gum base (non-SBR or SBR) | |
| | Bubble gum | 12–25 |
| | Regular | 12–25 |
| | Sugar | 28–32 |
| | Flavor | 0.2–3 |

| | Sugarless | Range % By Weight of Chewing Gum |
|---|---|---|
| A. | Water-soluble phase | |
| | Sorbitol | 25–35 |
| | Sorbitol syrup (% solids 68 to 72) | 18–30 |
| B. | Water-insoluble phase | |
| | Gum base (non-SBR or SBR) | |
| | Bubble gum | 12–25 |
| | Regular | 12–25 |
| | Mannitol or sorbitol | 20–30 |
| | Flavor | 0.2–3 |

These chewing gums are disclosed in U.S. Pat. No. 4,217,368.

The above chewing gums may be prepared as described below. The gum base is first melted, emulsifier such as lecithin and sugar, sorbitol or mannitol are thoroughly mixed, for at least two minutes, in the melted gum base (which is maintained at a temperature preferably not exceeding 200° F.) to effect uniform distribution and seal the second sweetener in the gum base. Flavors, food acids (where desired) are added and the mixture is mixed for from 1 to 2 minutes. The mix, at this time, is a continuous cohesive mass. At this stage auxiliary or first sweetener, preferably in particulate form, which may be another portion of the same sweetener as mixed with the gum base, or other sweetener, is added to the continuous mass with mixing being continued for from 1 to 5 minutes, thereby causing the continuous mass to be torn apart into discrete, separate masses of gum base containing sugar, sorbitol or mannitol sealed therein said discrete masses being suspended in particles of first sweetener to form a heterogeneous mass. The aqueous plasticizer or softener is added to and mixed with the heterogeneous mass for from 1 to 5 minutes, and preferably from 1 to 3 minutes. Thereafter, the solid flavor, for example, encapsulated or fixed on dextrin or gum arabic, and water-soluble acids may be added and mixed with the gum mass to form a smooth chewing gum which is ready for extrusion.

When the aqueous plasticizer or softener is added after the mix is in discontinuous discrete masses or clumps containing sweetener sealed therein and suspended in the auxiliary or first sweetener, substantially all water from the aqueous plasticizer, such as sorbitol syrup, will be taken up by the water-soluble particulate auxiliary or first sweetener, and the water will not be available for solubilizing the sweetener sealed in the gum base. The sweetener initially added to the melted gum base to form a continuous mass will be substantially buried in the gum base and protected from any solubilization (for example, due to aqueous polyol syrup) even after the gum base mix is torn into discrete masses or clumps.

It will be appreciated that substantially any conventional type chewing gum may be employed in forming the coextruded product of the invention.

In forming the coextruded final product, regardless of the type of chewing gum to be employed, the chewing gum for each of the outer shell and core portions are fed through coextrusion apparatus such as is available from Turbo-Bepex (Hutt) Company or other conventional equipment, to form a core portion bonded to an outer shell portion.

The coextruded chewing gum product of the invention may take various shapes, and sizes, may be multi-colored and/or multi-flavored, that is the core portion may be of a color and/or flavor different from the color and/or flavor of the outer shell portion. In addition, as indicated, different types of chewing gums may be employed in each of the core portion and outer shell portion to provide both initial burst of sweetness and flavor and thereafter prolonged sweetness and flavor.

The following Examples illustrate preferred embodiments of the present invention without, however, limiting the same thereto. All temperatures are expressed in °F.

EXAMPLE 1

A coextruded cherry flavored chewing gum in accordance with the present invention is prepared.

The soft core chewing gum portion of the coextruded product containing a non-SBR gum base of the following formulation is prepared as described below.

| Gum Base for Core Portion | Parts by Weight of the Gum Base |
|---|---|
| Polyisobutylene (M.W. 1,000,000) | 4 |
| Polyisobutylene (M.W. 50,000) | 6 |
| Polyvinyl acetate | 22 |
| Polyterpene (Piccolyte C-115-Hercules) | 7 |
| Polyethylene wax (M.W. 2000 melting point 254° F.) | 2 |
| Microcrystalline wax (melting point - 170° F.) | 2 |
| Paraffin wax | 7 |
| Glyceryl triacetate (triacetin) | 3 |
| Glyceryl monostearate | 2 |
| Acetylated monoglyceride | 4 |
| Hydrogenated soyabean oil flakes | 4 |
| Hydrogenated cottonseed oil flakes | 5 |
| Calcium carbonate | 32 |

The polyisobutylenes are added to a kettle-mixer and maintained under 60 lb. steam pressure for about 5 minutes. Thereafter, about 75% of the calcium carbonate and about 20% of the polyterpene resin are mixed in with the polyisobutylenes for about 70 minutes at which time a smooth uniform paste free of lumps is obtained. The remainder of the calcium carbonate and polyterpene resin are added with mixing for about 10 minutes. The polyethylene wax is then added in two portions with mixing for about 5 to 8 minutes with each portion. The polyvinyl acetate is then added in two portions with mixing for 7 minutes and 15 minutes, respectively. Thereafter, the microcrystalline wax and each of two portions of paraffin wax are added with mixing for 5, 5 and 10 minutes, respectively, under 60 lb. steam pressure. Next the glyceryl triacetate is slowly added with mixing for about 5 minutes, followed by the glyceryl monostearate and glyceryl monoacetate with mixing for about 5 minutes. The soyabean oil flakes and confectionery fat are separately added with mixing of about 5 and 10 minutes, respectively, to form the non-SBR gum base.

| Chewing Gum for Core Portion | Parts by Weight |
|---|---|
| Non-SBR gum base | 16.8 |
| Preformed sweetener combination | 70 |
| A. Solids | |
| Sucrose | 45 |
| B. Liquid | 25 |
| High fructose syrup | |
| (70% solids) | 25 |
| Liquid glucose (80% solids) | 20 |
| Invert sugar (70% solids) | 25 |
| Cherry flavor | 0.8 |
| Color | 0.2 |
| Corn syrup solids (Maltrin M-100 DE8-17) (Grain Processing Corp.) | 8 |
| Lecithin | 0.4 |

The solids (A) and liquids (B) are mixed together and heated to 240° F. with constant agitation to form a homogeneous mass. The homogeneous mass is allowed to cool by exposure to ambient air for 20 minutes to cause the sweetener solids to recrystallize and form an amorphous mass.

The gum base is melted (160°-175° F.) and placed in a pre-heated standard dough mixer equipped with sigma blades. Color is added and mixed for 3-4 minutes. About one-third of the preformed amorphous sweetener mass is added and mixed for 1-3 minutes. Thereafter, another one-third portion of preformed amorphous sweetener mass is added and mixed for 2-3 minutes. The Maltrin is added and mixed for 1-2 minutes followed immediately with lecithin and flavor and mixed for 2-3 minutes. The remaining preformed amorphous sweetener mass is added and the mixture mixed for 2-5 minutes.

The chewing gum prepared above is now ready for extrusion. However, before extruding, it is found to have a pleasant sweet taste, good softness retention, a smooth texture and amorphous bite through and enhanced flavor, but is sticky and might be difficult to handle in a conventional gum wrapping machine.

A long-lasting cherry flavor chewing gum for use as the outer shell in the coextruded gum product of the invention is prepared as described in Example 1 of U.S. Pat. No. 4,085,227 from the following ingredients:

| Outer Portion Ingredients | Parts by Weight |
|---|---|
| Non-SBR gum base (as described for core portion) | 30.5 |
| Powdered sugar | 50 |
| 44° Corn syrup | 18 |
| Lecithin | 0.3 |
| Coloring | 0.2 |
| Flavor oil | 1 |

The gum base formed as described above is combined with chewing gum ingredients as set out in the above table to form a non-stick non-tack chewing gum which remains soft over extended periods even without the presence of antioxidants. In addition, the gum base appears to extend sweetness and flavor of the chewing gum over substantially longer periods than previously thought possible.

Each of the above formulations is fed to a double rotary bar roll press model DDP Turbo International (Hutt-BEPEX) wherein a coextruded product is formed which contains a core portion having 6% moisture surrounded by and bonded to an outer shell portion.

The so-formed coextruded product is formed into blocks which are easy to wrap without having a wrapper removal problem, employing conventional wrapping apparatus. The coextruded gum is found to have an initial sweet and flavorful taste provided by the outer shell portion and thereafter a much prolonged level of flavor and sweetness provided by the core portion.

EXAMPLES 2 AND 3

Coextruded sugarless chewing gums are prepared from the following ingredients employing the procedure outlined in Example 1.

|  | Parts by Weight | |
| --- | --- | --- |
| Core Portion | Ex. 2 | Ex. 3 |
| Non-SBR gum base (prepared as described in Example 1) | 20 | 22 |
| Preformed sweetener combination | 70 | 70 |
| A. Solids | | |
| Sorbitol | 45 | 0 |
| Hydrogenated starch hydrolysate | 0 | 45 |
| B. Liquid | | |
| Sorbitol syrup | 25 | — |
| Hydrogenated starch hydrolysate syrup | 0 | 25 |
| Flavor | 0.8 | 0.8 |
| Color | 0.2 | 0.2 |
| Corn syrup solids | 8 | 8 |
| Lecithin | 0.4 | 0.4 |

The Examples 2 and 3 chewing gums are ready for coextrusion. Prior to extrusion, they are found to have a pleasant sweet taste, good softness retention, smooth and amorphous bite through and enhanced flavor; however, their stick properties do not allow them to be used in conventional wrapping equipment.

Outer Shell Portion

The following sugarless formulation is employed as the outer shell in each of the Examples 2 and 3 products.

| Ingredient | Parts by Weight |
| --- | --- |
| Gum base (conventional styrene-butadiene type) | 24 |
| Sorbitol-powder | 49 |
| Sorbitol liquid (68–70% sorbitol) | 25 |
| Yelkin | 0.5 |
| Flavor | 2 |

The outer shell chewing gum portion is prepared as follows:

Gum base is melted and maintained at a temperature within the range of 150°–175° F. Softener is added and then the solid sugar alcohols are added slowly with stirring. Thereafter, liquid flavor is added and the mixture is stirred until homogeneous. Sugar alcohols are slowly added and then artificial and/or natural sweetener (where employed).

Where spray dried flavors are employed, they are added with the artificial sweeteners.

The above mixture is stirred until homogeneous, is cooled, and ready for extrusion.

Each of the above formulations is fed to a double rotary bar roll press model DDP Turbo International (Hutt-BEPEX) wherein a coextruded sugarless product is formed which contains a core portion having 6% moisture surrounded by and bonded to an outer shell portion.

The so-formed coextruded product is formed into blocks which are easy to wrap, without having a wrapper removal problem, employing conventional wrapping apparatus. The coextruded gum is found to have an initial sweet and flavorful taste provided by the outer shell portion and thereafter a much prolonged level of flavor and sweetness provided by the core portion.

EXAMPLE 4

A coextruded peppermint flavored chewing gum in accordance with the present invention is prepared as follows.

Core Portion

A core gum portion base having the composition as set out below is prepared as described hereinafter.

| Gum Base for Core Portion | Parts by Weight of the Gum Base |
| --- | --- |
| Polyisobutylene (M.W. 50,000) | 10 |
| Polyvinyl acetate | 22 |
| Polyterpene (Piccolyte C-115-Hercules) | 7 |
| Polyethylene wax (M.W. 2000 melting point 254° F.) | 2 |
| Microcrystalline wax (melting point - 170° F.) | 2 |
| Paraffin wax | 7 |
| Glyceryl triacetate (triacetin) | 3 |
| Glyceryl monostearate | 2 |
| Acetylated monoglyceride | 4 |
| Hydrogenated soyabean oil flakes | 4 |
| Hydrogenated cottonseed oil flakes | 5 |
| Calcium carbonate | 32 |

The above non-SBR gum base is prepared as described in Example 1.

| Chewing Gum for Core Portion | Parts by Weight |
| --- | --- |
| Gum base | 17 |
| Sugar (dispersed in melted gum base) | 30 |
| (mixed with cooled gum base) | 30 |
| Fructose syrup (42% fructose solids) | 21 |
| Liquid flavor | 1 |
| Spray dried flavor | 1 |

The gum base is added to a steam jacketed kettle equipped with a sigma blade mixer. The base is melted and adjusted to a temperature of about 180° F. to 200° F.

About one-half of the sugar is thoroughly mixed into the melted gum base (while the gum base is folding well) for about 3 minutes to disperse the sugar throughout the continuous mass of gum base. The sugar is thereby trapped in or otherwise protected by the gum base.

Thereafter, the liquid flavor is added with mixing for about 1 minute. The remain sugar is added with mixing for about 2 minutes thereby causing the mass to be torn apart into discrete pieces. The pure fructose syrup is added to the discrete pieces of gum base with mixing for about 2 minutes, and the spray dried flavor is added with mixing for about 2 minutes. The mass, now smooth and continuous, is removed from the kettle and is ready for coextrusion.

The so-formed gum is found to be easily unwrapped and has a clean fresh taste, easy bite through, is soft and has improved flavor characteristics.

Outer Shell Portion

An outer shell portion having the following ingredients is prepared as described below.

| Ingredient | Parts by Weight |
| --- | --- |
| Gum base (as described for the core portion) | 24 |
| Sugar pulverized | 61 |
| High fructose corn syrup (42% fructose, 29% H₂O) | 14 |
| Flavor | 1 |

The gum base is melted in a kettle at 150° F. and a small portion (10–15%) of the pulverized sugar and the high fructose corn syrup are added with mixing over a 5 minute period. Thereafter, the remaining ingredients are added according to conventional chewing gum practice to form a non-tacky chewing gum which has excellent softness and shelf-life even in the absence of antioxidants, and has extended flavor and sweetness.

Each of the above chewing gum formulations are formed into a coextruded product as described in Example 1, which product has an initial flavor and sweetness impact provided by the outer shell and a prolonged sweet and flavorful taste provided by the core. In addition, the coextruded gum may be easily wrapped using conventional wrapping machines and will not stick to its wrapper even during warm weather.

What is claimed is:

1. A coextruded chewing gum having a soft gum center portion, comprising an extruded soft gum core portion formed of chewing gum containing at least about 5% up to about 10% by weight moisture based on the weight of the core portion and an outer shell portion formed of chewing gum having a harder consistency than said core portion, said soft core portion comprising a polyisobutylene elastomer or a mixture of medium and lower molecular weight polyisobutylene elastomers having a molecular weight within the range of from about 750,000 to 1,300,000 and 37,000 to 80,000, respectively, in an amount of from about 0.5% to about 25% by weight of said core portion gum base, plasticizers comprising glyceryl triacetate and acetylated monoglyceride in an amount of from about 0.5% to about 25% by weight of said core portion gum base, one or more hydrophilic-type detackifiers which absorb saliva and become slippery, one or more filler-texturizing agents, one or more softening agents having a melting point above about 22° C., one or more emulsifiers which function as slip agents and impart hydrophilic properties to the elastomer, and an anti-tack combination comprising a polyterpene resin, one or more waxes to enhance bite through characteristics, and optionally a polyethylene wax, said outer shell portion formed of chewing gum formulations generally known in the art and extruded simultaneously with said core portion so that said outer shell portion is bonded to said core portion to provide a support and protective barrier therefor to retain said moisture in said core portion and retard migration of moisture therefrom.

2. The coextruded chewing gum as defined in claim 1 wherein said core portion comprises from about 5 to about 90% by weight of said coextruded chewing gum and said outer shell portion comprises from about 10 to about 95% by weight of said coextruded chewing gum.

3. The coextruded chewing gum as defined in claim 1 wherein said core portion is present in a weight ratio to said outer shell portion of from about 0.05:1 to about 9:1.

4. The coextruded chewing gum as defined in claim 1 wherein said anti-tack combination comprises polyterpene resin, one or more waxes and a polyethylene wax.

5. The coextruded chewing gum as defined in claim 1 wherein the polyterpene resin is present in an amount of up to about 25% by weight of said non-styrene-butadiene gum base.

6. The coextruded chewing gum as defined in claim 4 wherein said polyethylene wax is present in an amount of from about 0.25 to about 5% by weight of the non-styrene-butadiene gum base.

7. The coextruded chewing gum as defined in claim 1 wherein said one or more waxes are employed in an amount within the range of from about 2 to about 25% by weight of the non-styrene-butadiene gum base and comprise microcrystalline wax, paraffin wax or mixtures thereof.

8. The coextruded chewing gum as defined in claim 1 wherein said medium molecular weight polyisobutylene is employed in a weight ratio to the lower molecular weight polyisobutylene of within the range of from about 1:1 to about 1:10.

9. The coextruded chewing gum as defined in claim 1 wherein said polyisobutylenes have molecular weight of 1,000,000 to 1,200,000 and 40,000 to 50,000, respectively.

10. The coextruded chewing gum as defined in claim 1 wherein the polyisobutylene elastomer comprises polyisobutylene having a molecular weight of from about 950,000 to about 1,050,000 and comprises from 0 to about 10% by weight of said gum base.

11. The coextruded chewing gum as defined in claim 1 wherein the polyisobutylene elastomer comprises polyisobutylene having a molecular weight of from about 37,000 to about 46,000 and comprises from 0 to about 18% by weight of said gum base.

12. The coextruded chewing gum as defined in claim 10 wherein said glyceryl triacetate is employed in an amount within the range of from about 0 to about 10% by weight of said non-styrene-butadiene gum base and said glyceryl monoacetate is employed in an amount within the range of from about 0 to about 15% by weight of said non-styrene-butadiene gum base.

13. The coextruded chewing gum as defined in claim 1 wherein the hydrophilic-type detackifier is employed in an amount within the range of from about 5 to about 60% by weight of the gum base and is polyvinyl acetate.

14. The coextruded chewing gum as defined in claim 1 wherein said chewing gum forming said core gum portion further comprises a preformed recrystallized sweetener combination comprising at least two sweeteners which have been recrystallized as a mixture, dispersed as said recrystallized mixture in said gum base, and one or more flavors dispersed in said gum base.

15. The coextruded chewing gum as defined in claim 14 wherein at least one of said sweeteners in said recrystallized mixture is sucrose, fructose syrup or a mixture thereof.

16. The coextruded chewing gum as defined in claim 14 wherein said recrystallized mixture further includes liquid glucose, corn syrup, hydrogenated starch hydrolysate, invert sugar, sorbitol syrup, or mixtures of two or more such sweeteners.

17. The coextruded chewing gum as defined in claim 14 wherein said recrystallized mixture comprises a mixture of one or more solid sweeteners and one or more liquid sweeteners which coat said solid sweeteners.

18. The coextruded chewing gum as defined in claim 17 wherein said solid sweetener comprises sucrose or sorbitol and said liquid sweetener comprises high fructose syrup, sorbitol syrup, hydrogenated starch hydrolysate, corn syrup, invert sugar or mixtures of two or more thereof.

19. The coextruded chewing gum as defined in claim 14 wherein said recrystallized mixture comprises from about 35 to about 95% by weight sucrose, from about 5 to about 50% by weight high fructose syrup, from about 1 to about 30% by weight liquid glucose, from about 1 to about 30% by weight corn syrup, and from about 1 to about 25% by weight invert sugar, all of said percents being based on the weight of the recrystallized mixture of said core portion.

20. The coextruded chewing gum as defined in claim 1 wherein said core portion is free of corn syrup and said core portion comprises gum base, pure fructose syrup, sweetener-bulking agent, and flavor, and containing no additional humectant.

21. The coextruded chewing gum as defined in claim 20 wherein said sweetener-bulking agent is sugar or sorbitol.

22. The coextruded chewing gum as defined in claim 1 wherein said outer shell portion includes a non-styrene-butadiene gum base.

23. A method for forming a coextruded chewing gum as defined in claim 1, which comprises extruding said soft core portion chewing gum simultaneously while extruding said outer shell portion chewing gum about said extruded core portion to completely surround and form a protective barrier around and bonded to the core portion and thereby retard migration of moisture from said core portion to the outer shell portion.

* * * * *